United States Patent Office 3,393,608
Patented July 23, 1968

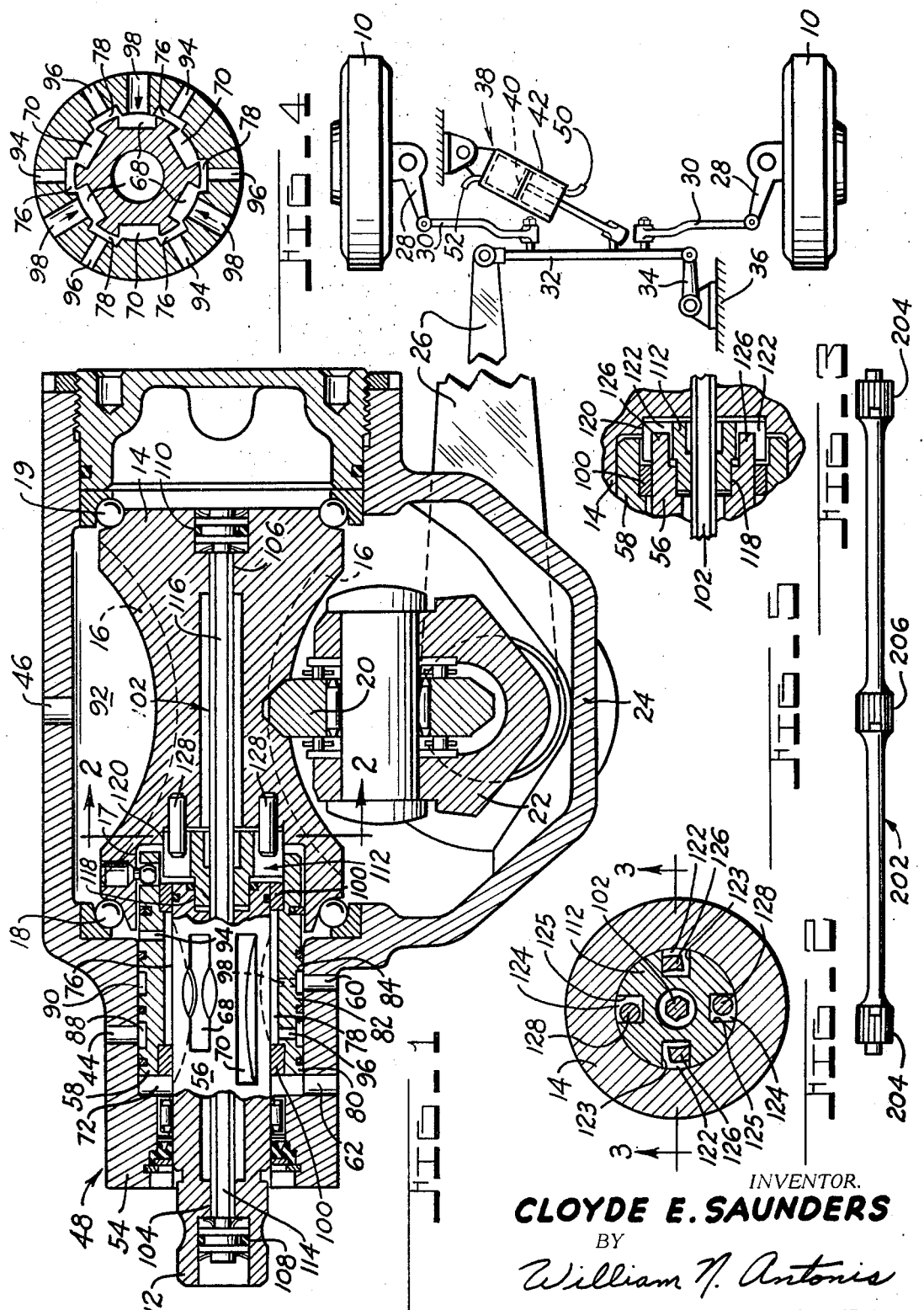

3,393,608
POWER STEERING MECHANISM
Cloyde E. Saunders, South Bend, Ind., assignor to The Bendix Corporation, a corporation of Delaware
Filed Oct. 20, 1966, Ser. No. 588,074
10 Claims. (Cl. 91—375)

This invention relates to power steering and more particularly to improvements in a mechanical reaction arrangement for providing "feel" in connection with a power steering mechanism of the type shown in Eddy Patent No. 3,273,465.

One of the objects of this invention is to provide an improved torsion bar mechanical "feel" arrangement which will provide a definite center feel, immediate gradual increasing effort levels during a turning maneuver, and improved returnability to center after a turning maneuver has been completed.

Another object of this invention is to provide a torsion bar mechanical "feel" arrangement which will overcome steering wheel inertia and seal drag in the power steering valve.

A further object of this invention is to provide a mechanical "feel" arrangement which utilizes a preloaded torsion bar for achieving the desired results.

More specifically, it is an object of this invention to provide a separate drive member which is fixedly connected to and located between the ends of a torsion bar for separating the torsion bar into two independent torsionally preloaded sections, one of which will be further twisted to provide increased torsional reaction when the steering wheel is turned in one direction and the other of which will be further twisted to provide increased torsional reaction when the steering wheel is turned in the opposite direction.

Another important object of this invention is to provide a drive member of the type described which also serves as a bearing for the valve components and the worm of the power steering mechanism.

A still further object of this invention is to provide an intermediate drive member of the type described which permits an accurate, simplified assembly method of preloading each torsion bar section and which simplifies the design of the torsion bar.

The above and other objects and features of this invention will be apparent from the following description of the mechanism taken in connection with the accompanying drawing which forms a part of this specification and in which:

FIGURE 1 is a sectional view of a power steering unit constructed in accordance with the present invention which is shown in association with parts of a vehicle drawn schematically;

FIGURE 2 is a sectional view taken substantially along line 2—2 of FIGURE 1;

FIGURE 3 is a fragmentary sectional view taken substantially along line 3—3 of FIGURE 2;

FIGURE 4 is a composite sectional view which shows the power steering valve passages moved into the same plane for purposes of more clearly illustrating the flow paths within the valve; and FIGURE 5 shows another torsion bar embodiment which could be utilized in connection with the present invention.

Referring to FIGURE 1, it will be seen that reference numeral 10 designates the front wheels of a vehicle to be steered by rotation of the steering shaft (not shown) which is suitably connected to the input shaft 12. Operatively connected to the input shaft 12 is an hourglass worm 14 having a grooved type cam track 16 formed thereon and a bore 17 located within and at one end thereof which extends substantially to the bottom of the cam track without interfering therewith, said worm being held against axial displacement by radial thrust bearings 18 and 19 located at the end of the worm. A roller sector gear 20 is arranged to engage the cam track 16 of the worm and is carried by one end of a sector shaft 22 which is suitably journaled in gear housing 24. A pitman arm 26 is connected to the other end of the sector shaft 22 and to the spindle arms 28 of the wheels 10 through a steering linkage assembly which includes tie rod 30, a cross tie rod 32 and an idler arm 34 suitably pivoted at one end to the vehicle frame 36.

The hydraulic system of the power steering mechanism includes a fluid motor 38 which may be connected between the cross tie rods 32 and the vehicle frame 36, as shown in FIGURE 1. However, the fluid motor may be located at any other suitable position, for example, integral with the steering gear housing. A piston 40 divides cylinder 42 into opposed chambers constantly communicating respectively with cylinder ports 44 and 46 of rotor valve 48 via conduits 50 and 52.

The main components of the rotary valve 48 are the valve housing 54, the rotor 56 which is formed on the input shaft 12, and the sleeve 58 which is located between the rotor and the valve housing. Located in the housing 54 are inlet port 60, outlet port 62, and the two previously mentioned cylinder ports 44 and 46. The rotor 56 contains six axially extending equally spaced slots formed on the outer periphery thereof, three of which are pressure slots and are designated by the reference numeral 68 and the other three of which are return slots and are designated by the reference numeral 70. It will be noted that the return slots 70 are longer than the pressure slots 68 so that the return slots may communicate with the return chamber 72 located at one end of sleeve 58.

Located on the inner periphery of valve sleeve 58 are six axially extending equally spaced slots, three of which are designated by the reference numeral 76 and the other three of which are designated by the reference numeral 78. Formed on the outer periphery of valve sleeve 58 are three annular lands 80, 82 and 84, and two annular grooves 88 and 90. Since sleeve 58 extends into the bore 17, it is possible to eliminate the fourth annular land and the third annular groove both of which are normally common to rotary valves of this general type, as typified by Davis Patent No. 1,947,973. In view of the arrangement shown, it is possible to communicate steering gear cavity 92 with sleeve slot 76 via radially extending passages 94 without the necessity of utilizing an annular groove on the valve sleeve since radially extending passages 94 open directly into the steering gear cavity. On the other hand, radially extending passages 96 communicate sleeve slots 78 with annular groove 88. Radially extending passages 98 communicate rotor slots 68 with annular groove 90. Thus, it can be seen from the drawing, particularly FIGURE 4, that when the rotary valve 48, which is an open center valve, is in a neutral straight-ahead position, flow will occur from inlet port 60 to outlet port 62 via annular groove 90, radially extending sleeve passages 98, axially extending rotor slots 68, axially extending sleeve slots 76 and 78, axially extending rotor slots 70 and return chamber 72. Cylinder port 44 communicates with sleeve slots 78 by radial sleeve passages 96 and annular grooves 88 whereas cylinder port 46 communicates with sleeve slots 76 via radial passages 94 and steering gear cavity 92. Seals are located in annular lands 80, 82 and 84 to prevent leakage thereacross. These seals are glass filled "Teflon" endless sealing rings of rectangular section. Stop-off rings 100 seal off the axially extending sleeve slots 76 and 78 and also serve as the bearings.

The three equally spaced flow paths, previously described, give balanced forces within the valve due to fluid flow, thereby eliminating any stickiness due to hydraulic unbalance. Upon rotation of the steering wheel, valve rotor 56 is rotated relative to the valve sleeve 58. This movement is in proportion to the input torque. As can more clearly be seen by reference to FIGURE 4, relative rotation between valve rotor 46 and valve sleeve 58 will cause one of the cylinder ports 44, 46 to communicate with the inlet port 60 and the other cylinder port to communicate with the outlet port 62. This will create a differential pressure across piston 40 and will result in power assisted steering.

A hexagonally shaped torsion bar 102 has one end thereof located in a corresponding hexagonal bore 104 of the input shaft 12 for effecting a rigid connection therewith and has the other end thereof located in a corresponding hexagonal bore 106 of the worm 14 for likewise effecting a rigid connection therewith. Sealing elements 108 and 110 are located at each end of the torsion bar. A washer-like drive member 112 having a corresponding hexagonal bore therein for effecting a rigid connection with the torsion bar is located intermediate the ends thereof. The drive member, in addition to separating the torsion bar into two sections, namely upper section 114 and lower section 116, also serves as a bearing for valve rotor 56 and worm 14 along surfaces 118 and 120. The driving member is formed with two pairs of oppositely disposed slots, namely slots 122 and slots 124. Two tangs 126 which are formed on and extend from the end of the combined input member 12 and rotor 56 are located in slots 122 and each engages one side of the slot in which it is located. Two anchor pins 128 which are rigidly connected to and extend from the worm are located in slots 124 and each likewise engages one side of the slot in which it is located.

In order to torsionally preload the upper and lower sections 114 and 116 of the torsion bar, the drive member 112 is suitably connected to the torsion bar at its mid position. The lower end of the torsion bar is then inserted into the hexagonal bore 106 of the worm in a predetermined position. The drive member is then rotated until the slots 124 thereof are in alignment with the anchor pins 128 at which time the drive member is then moved downwardly so that the pins are located in the slots. With the pins 128 in the slots 124 the drive member will be unable to rotate and the torsional preload of the lower section 116 of the torsion bar will be maintained. If the upper end of the torsion bar is then inserted in the corresponding hexagonal bore 104 of the input shaft 12 in a predetermined position, the input shaft can then be rotated until the tangs 126 are in alignment with slots 122 at which time the input shaft can be moved towards the drive member so that the tangs are located in the slots. With the tangs 126 in the slots 122 the input shaft will be unable to rotate and the torsional preload of the upper section 114 of the torsion bar likewise will be maintained. The resulting integral input shaft-worm subassembly can then be suitably assembled with the rest of the power steering components.

With the foregoing in mind, mechanical "feel" will be provided in the following manner: Clockwise rotation of the input shaft rotor 12 will cause the upper section 114 of the torsion bar to twist further, since the tanged rotor is rotated with respect to the drive member. The twisting forces which arise upon such clockwise rotation are, in effect, applied at the uppermost locked end of the torsion bar to cause further twisting of the upper section 114 of the torsion bar. No additional twisting of the lower section 116 of the torsion bar will occur during such clockwise rotation. On the other hand, if the input shaft rotor 12 is rotated in a counterclockwise direction, such rotation will cause the lower section 116 of the torsion bar to be twisted further since the tangs 126 will cause further rotation of the drive member with respect to the worm. Thus, in this instance, the twisting forces which arise upon such counterclockwise rotation of the input shaft are, in effect, applied from the mid point of the torsion bar by the tangs 126 which drivingly engage the drive member 112. No additional twisting of the upper section 114 of the torsion bar will occur during such clockwise rotation.

Upon rotation of the input shaft 12 in a clockwise direction, limited relative rotary motion between the shaft and worm 14 is permitted by virtue of the lost motion which occurs between the tangs 126 and the sides 123 of the slots 122 which are not normally contacted by the tangs. Upon rotation of the input shaft in a counterclockwise direction, limited relative rotary motion between the input shaft and the worm is permitted by virtue of the lost motion which occurs between the normally non-contacting sides 125 of the slots 124 and the anchor pins 128. Thus, in the event of power failure, a direct mechanical drive between the input shaft and the worm is achieved.

The several practical advantages which flow from this invention are believed to be obvious from the above description and other advantages may suggest themselves to those who are familiar with the art to which the invention relates.

Furthermore, although this invention has been described in connection with a specific embodiment, it will be obvious to those skilled in the art that various changes may be made in the form, structure and arrangement of parts without departing from the spirit of the invention. For example, instead of utilizing a torsion bar which has a hexagonal cross section from one end to the other, as shown in FIGURE 1, a torsion bar 202 having a round cross section, as shown in FIGURE 5, with suitable splines or serrations 204 at the ends thereof for fixedly connecting the torsion bar to the input shaft and the worm and splines or serrations 206 at the mid point thereof for suitably connecting the drive member thereto could be utilized. It will also be obvious that with respect to torsion bars of the type shown in FIGURE 5 that the bar could be formed in a polygonal shape only at the points at which the serrations are shown. Accordingly, I do not desire to be limited to the specific embodiments disclosed herein primarily for purposes of illustration, but instead desire protection falling within the scope of the appended claims.

Having thus described the various features of the invention what I claim as new and desire to secure by Letters Patent is:

1. In a power steering mechanism including an input member, an output member, and a fluid motor operatively connected to said output member, the combination within a housing of a worm having groove means formed thereon, follower means operatively connected to said output member and engaging said groove means, a pair of relatively rotatable telescoped tubular elements through which fluid flow to and from said motor is controlled, one of which is operatively connected to said input member and the other of which is operatively connected to said worm, a torsion bar having one end thereof fixedly connected to said input member and the other end thereof fixedly connected to said worm, a drive member fixedly connected to said torsion bar and located between the ends thereof for separating said torsion bar into two sections, said drive member having first and second slot means located therein, first rigid means operatively connected to said worm and located in said first slot means, said first rigid means being in abutment with one side of said first slot means for causing only one of the sections of said torsion bar to twist and increase the torsional reaction thereof when said input member is rotated in one direction, and second rigid means operatively connected to said input member and located in said second slot means, said second rigid means being in abutment with one side of said second slot means for causing only the other of the sections of said torsion bar to twist and increase the torsional reaction thereof when said input member is rotated in the opposite direction.

2. The power steering mechanism, as defined in claim 1, wherein said drive member includes bearing means formed thereon for bearing engagement with said worm and one of said tubular elements.

3. The power steering mechanism, as defined in claim 2, wherein said drive member is in bearing engagement with the tubular element operatively connected to said input member.

4. The power steering mechanism, as defined in claim 3, wherein said first slot means comprises a plurality of slots, and said first rigid means comprises a plurality of pins extending from said worm, one of which is located in each of the slots of said first slot means.

5. The power steering mechanism, as defined in claim 4, wherein said second slot means comprises a plurality of slots, and said second rigid means comprises a plurality of tangs formed on and extending from the tubular element operatively connected to said input member, one of which is located in each of the slots of said second slot means.

6. The power steering mechanism, as defined in claim 5, wherein said drive member is a washer-like member.

7. The power steering mechanism, as defined in claim 6, wherein rotation of said input member in said one direction causes said tangs to rotate said drive member with respect to said worm to thereby twist the section of said torsion bar fixedly connected to said drive member and said form, and rotation of said input member in said other direction causes rotation of the tanged tubular element with respect to said drive member to thereby twist the section of said torsion bar fixedly connected to said drive member and said input member.

8. The power steering mechanism, as defined in claim 7, wherein said tubular element having the tangs is part of said input member.

9. The power steering mechanism, as defined in claim 7, wherein said torsion bar has a polygonal shape and said drive member has a corresponding polygonal bore for receiving said torsion bar and effecting a rigid connection therewith.

10. The power steering mechanism, as defined in claim 7, wherein said torsion bar has a round shape with a serrated portion thereon and said drive member has a corresponding serrated bore for receiving the serrated portion of said torsion bar and effecting a rigid connection therewith.

References Cited
UNITED STATES PATENTS

| | | | |
|---|---|---|---|
| 3,162,263 | 12/1964 | Brown | 91—375 |
| 3,273,465 | 9/1966 | Eddy | 91—375 |
| 3,296,939 | 1/1967 | Eddy | 91—375 |

PAUL E. MASLOUSKY, *Primary Examiner.*